United States Patent
Tsou et al.

(10) Patent No.: US 9,584,030 B2
(45) Date of Patent: Feb. 28, 2017

(54) CONTROLLER FOR ELIMINATING ACOUSTIC NOISE OF A POWER CONVERTER AND RELATED METHOD THEREOF

(71) Applicant: Leadtrend Technology Corp., Hsin-Chu (TW)

(72) Inventors: Ming-Chang Tsou, Hsin-Chu (TW); Meng-Jen Tsai, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 14/732,801

(22) Filed: Jun. 8, 2015

(65) Prior Publication Data

US 2015/0357925 A1 Dec. 10, 2015

(30) Foreign Application Priority Data

Jun. 9, 2014 (TW) .............................. 103119925 A

(51) Int. Cl.
- H02M 3/335 (2006.01)
- H02M 1/44 (2007.01)
- H02M 1/00 (2006.01)

(52) U.S. Cl.
CPC .......... *H02M 3/33507* (2013.01); *H02M 1/44* (2013.01); *H02M 2001/0035* (2013.01); *Y02B 70/16* (2013.01)

(58) Field of Classification Search
CPC ..... H02M 3/33507; H02M 2001/0035; H02M 1/44; Y02B 70/16
See application file for complete search history.

(56) References Cited

U.S. PATENT DOCUMENTS

| 7,202,609 B2 | 4/2007 | Langeslag |
| 7,701,186 B2 | 4/2010 | Balakrishnan |
| 2009/0147546 A1* | 6/2009 | Grande ............. H02M 3/33523 363/21.16 |
| 2010/0302815 A1* | 12/2010 | Li ..................... H02M 3/33523 363/21.09 |

(Continued)

FOREIGN PATENT DOCUMENTS

| TW | 200917630 | 4/2009 |
| TW | 200939604 | 9/2009 |
| TW | 201407944 | 2/2014 |

*Primary Examiner* — Jue Zhang
(74) *Attorney, Agent, or Firm* — Winston Hsu; Scott Margo

(57) ABSTRACT

A controller for eliminating acoustic noise of a power converter includes a control unit and a gate signal generation unit. The control unit is used for detecting a frequency corresponding to a gate control signal in a burst mode of the power converter. When the frequency is greater than a predetermined frequency, the control unit increases a resistance of a compensation resistor coupled to a compensation pin of the power converter; and when the frequency is less than the predetermined frequency, the control unit decreases the resistance of the compensation resistor. The gate signal generation unit is coupled to the control unit for generating the gate control signal to a power switch of a primary side of the power converter according to the resistance of the compensation resistor. The power switch is turned on according to the gate control signal.

10 Claims, 6 Drawing Sheets

(56) References Cited

U.S. PATENT DOCUMENTS

| | | | |
|---|---|---|---|
| 2011/0122660 A1* | 5/2011 | Cacciotto | H02M 3/33515 363/21.18 |
| 2014/0003094 A1* | 1/2014 | Sorensen | H02M 3/337 363/21.02 |
| 2014/0043876 A1* | 2/2014 | Tsou | H02M 7/04 363/78 |

* cited by examiner

CONTROLLER FOR ELIMINATING ACOUSTIC NOISE OF A POWER CONVERTER AND RELATED METHOD THEREOF

BACKGROUND OF THE INVENTION

1. Field of the Invention

The present invention relates to a controller for eliminating acoustic noise of a power converter and a related method thereof, and particularly to a controller and a related method thereof that can increase a frequency corresponding to a gate control signal when the frequency corresponding to the gate control signal is greater than a predetermined frequency, and decrease the frequency corresponding to the gate control signal when the frequency corresponding to the gate control signal is less than the predetermined frequency to eliminate acoustic noise of a power converter.

2. Description of the Prior Art

When a secondary side of a power converter is coupled to a light load, a controller applied to the power converter can generate agate control signal corresponding to a burst mode of the power converter to a power switch of a primary side of the power converter, wherein the power switch is turned according to the gate control signal generated by the controller. Therefore, when the secondary side of the power converter is coupled to the light load, power consumption of the power converter can be decreased because the power converter enters the burst mode.

When a frequency corresponding to the gate control signal generated by the controller falls within a human auditory frequency range, the power converter will generate annoying acoustic noise. However, the prior art for eliminating acoustic noise of the power converter has poorer power saving, more complicated circuits, larger area, larger ripples in an output voltage of the power converter, and so on. Therefore, the prior art is not a good choice for a designer of the controller.

SUMMARY OF THE INVENTION

A first embodiment of the present invention provides a controller for eliminating acoustic noise of a power converter. The controller includes a feedback pin, a current detection pin, a burst mode signal generation module, a gate signal generation unit, and a turning-on time generation unit. The feedback pin is used for receiving a feedback voltage from a secondary side of the power converter, wherein the feedback voltage corresponds to an output voltage of the secondary side of the power converter. The current detection pin is used for generating a detection voltage according to a current flowing through a primary side of the power converter and a resistor. The burst mode signal generation module is coupled to the feedback pin for generating a burst mode signal according to a first reference voltage and the feedback voltage, or according to a second reference voltage and the feedback voltage. The gate signal generation unit is coupled to the burst mode signal generation module for generating a gate control signal corresponding to a burst mode of the power converter to a power switch of the primary side of the power converter according to the burst mode signal, wherein the power switch is turned on according to the gate control signal. The turning-on time generation unit is coupled to the burst mode signal generation module, the current detection pin, and the gate signal generation unit for determining a turning-on time of the power converter in the burst mode of the power converter according to the first reference voltage and the detection voltage, or according to the second reference voltage and the detection voltage.

A second embodiment of the present invention provides a controller for eliminating acoustic noise of a power converter. The controller includes a control unit and a gate signal generation unit. The control unit is used for detecting a frequency corresponding to a gate control signal in a burst mode of the power converter, wherein when the frequency is greater than a predetermined frequency, the control unit increases a resistance of a compensation resistor coupled to a feedback pin of the power converter, and when the frequency is less than the predetermined frequency, the control unit decreases the resistance of the compensation resistor. The gate signal generation unit is coupled to the control unit for generating the gate control signal to a power switch of a primary side of the power converter according to the resistance of the compensation resistor, wherein the power switch is turned on according to the gate control signal.

A third embodiment of the present invention provides a method for eliminating acoustic noise of a power converter, wherein a controller applied to the method includes a feedback pin, a current detection pin, a burst mode signal generation module, a turning-on time generation unit, and a gate signal generation unit, wherein the burst mode signal generation module includes a first comparator, a second comparator, and a control unit. The method includes the feedback pin receiving a feedback voltage from a secondary side of the power converter, wherein the feedback voltage corresponds to an output voltage of the secondary side of the power converter; the current detection pin generating a detection voltage according to a current flowing through a primary side of the power converter and a resistor; the burst mode signal generation module generating a burst mode signal according to a first reference voltage and the feedback voltage, or according to a second reference voltage and the feedback voltage; the turning-on time generation unit determining a turning-on time of the power converter in a burst mode of the power converter according to the first reference voltage and the detection voltage, or according to the second reference voltage and the detection voltage; and the gate signal generation unit generating a gate control signal corresponding to the burst mode of the power converter to a power switch of the primary side of the power converter according to the burst mode signal, wherein the power switch is turned on according to the gate control signal.

A fourth embodiment of the present invention provides a method for eliminating acoustic noise of a power converter, wherein a controller applied to the method includes a control unit and a gate signal generation unit. The method includes the control unit detecting a frequency corresponding to a gate control signal generated by the gate signal generation unit in a burst mode of the power converter; the control unit increasing a resistance of a compensation resistor coupled to a feedback pin of the power converter when the frequency is greater than a predetermined frequency; and the gate signal generation unit generating the gate control signal to a power switch of a primary side of the power converter according to the resistance of the compensation resistor, wherein the power switch is turned on according to the gate control signal.

The present invention provides a controller for eliminating acoustic noise of a power converter and a related method thereof. The controller and the method utilize a control unit to detect a frequency corresponding to a gate control signal generated by a gate signal generation unit, wherein when the frequency corresponding to the gate control signal is greater than a predetermined frequency, the controller and the method utilize a burst mode signal generation module, a turning-on time generation unit, the gate signal generation unit, a first reference voltage, a feedback voltage corresponding to an output voltage of a secondary side of the power converter, and a detection voltage corresponding to a current flowing through a primary side of the power converter to increase the frequency corresponding to the gate control signal; when the frequency corresponding to the gate control signal is less than the predetermined frequency, the controller and the method utilize the burst mode signal generation module, the turning-on time generation unit, the gate signal generation unit, a second reference voltage, the feedback voltage, and the detection voltage to decrease the frequency corresponding to the gate control signal. In addition, the controller and the method can also utilize the control unit to detect the frequency corresponding to the gate control signal generated by the gate signal generation unit, wherein when the frequency corresponding to the gate control signal is greater than the predetermined frequency, the controller and the method utilize the control unit to increase a resistance of a compensation resistor coupled to a feedback pin of the power converter, resulting in the frequency corresponding to the gate control signal being increased; and when the frequency corresponding to the gate control signal is less than the predetermined frequency, the controller and the method utilize the control unit to decrease the resistance of the compensation resistor coupled to the feedback pin of the power converter, resulting in the frequency corresponding to the gate control signal being decreased. Therefore, the present invention can ensure that the frequency corresponding to the gate control signal can fall outside a human auditory frequency range to eliminate acoustic noise of the power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
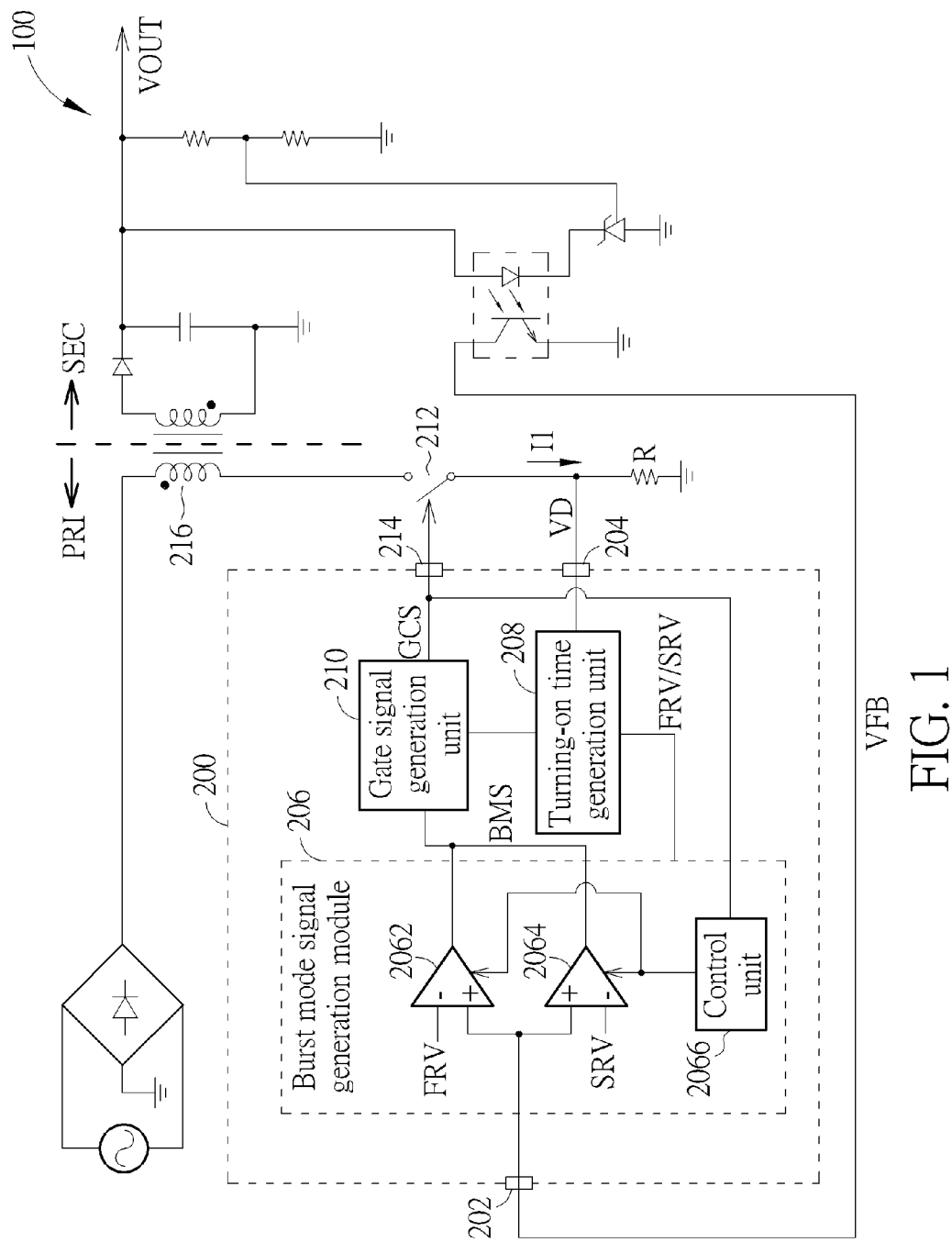
FIG. 1 is a diagram illustrating a controller for eliminating acoustic noise of a power converter according to a first embodiment.
Figure 2:
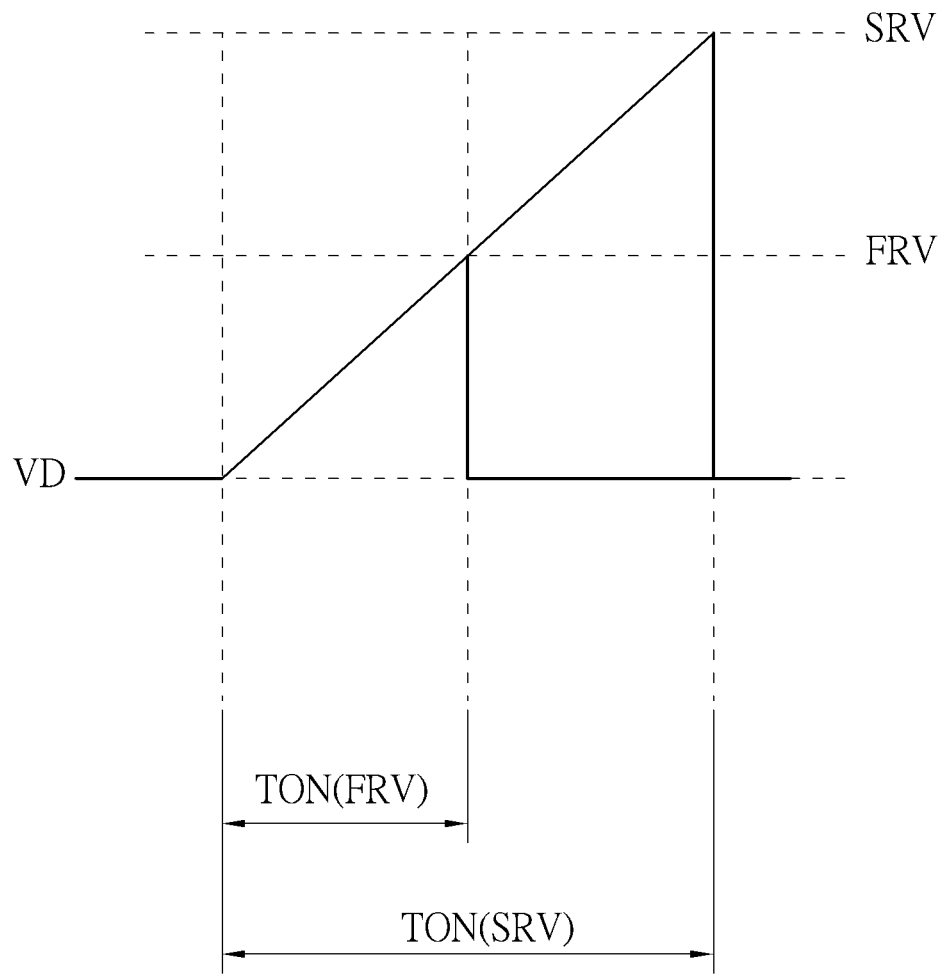
FIG. 2 is a diagram illustrating the turning-on time generation unit determining the turning-on time of the power converter according to the first reference voltage and the detection voltage, or according to the second reference voltage and the detection voltage.
Figure 3:
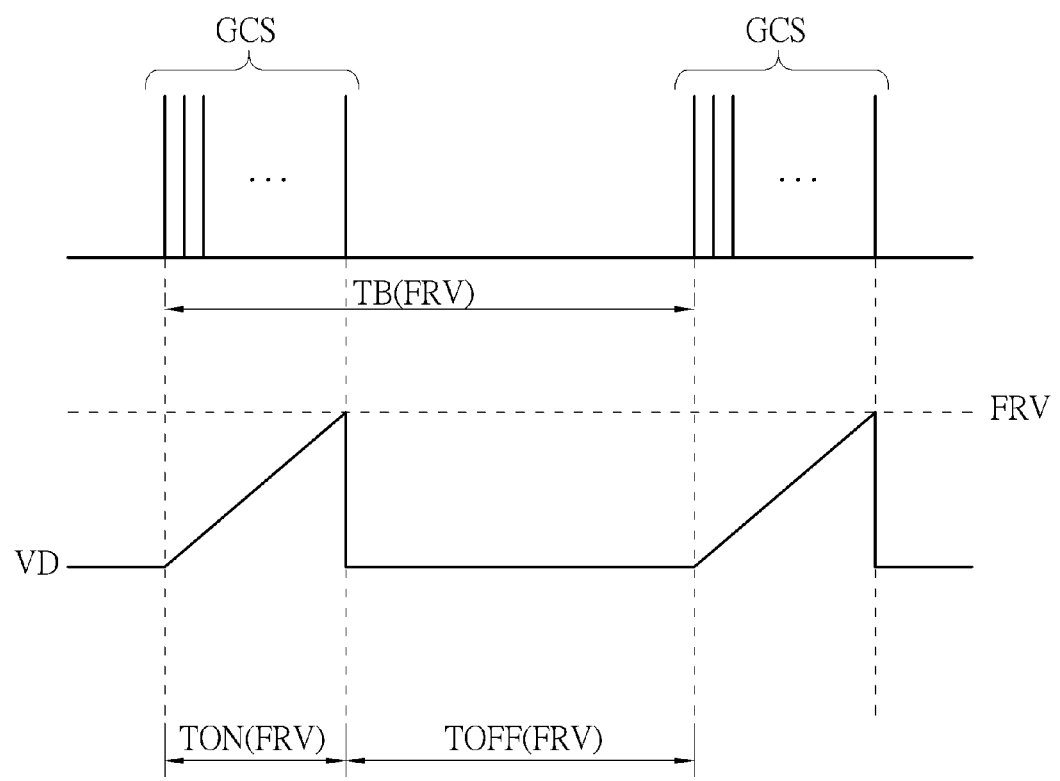
FIG. 3 is a diagram illustrating a period of the burst mode corresponding to the gate control signal.

Please refer to FIG. 1. FIG. 1 is a diagram illustrating a controller 200 for eliminating acoustic noise of a power converter 100 according to a first embodiment. As shown in FIG. 1, the controller 200 includes a feedback pin 202, a current detection pin 204, a burst mode signal generation module 206, a turning-on time generation unit 208, and a gate signal generation unit 210, wherein the burst mode signal generation module 206 includes a first comparator 2062, a second comparator 2064, and a control unit 2066. The feedback pin 202 is used for receiving a feedback voltage VFB from a secondary side SEC of the power converter 100, wherein the feedback voltage VFB corresponds to an output voltage VOUT of the secondary side SEC of the power converter 100. The current detection pin 204 is used for generating a detection voltage VD according to a current I1 flowing through a primary side PRI of the power converter 100 and a resistor R. The burst mode signal generation module 206 is coupled to the feedback pin 202 for generating a burst mode signal BMS according to a first reference voltage FRV and the feedback voltage VFB, or generating the burst mode signal BMS according to a second reference voltage SRV and the feedback voltage VFB, wherein the second reference voltage SRV is greater than the first reference voltage FRV. The gate signal generation unit 210 is coupled to the burst mode signal generation module 206 and the turning-on time generation unit 208 for generating a gate control signal GCS corresponding to a burst mode of the power converter 100 to a power switch 212 of the primary side PRI of the power converter 100 according to the burst mode signal BMS, wherein the gate control signal GCS is transmitted to the power switch 212 through a gate pin 214, and the power switch 212 is turned on according to the gate control signal GCS. The turning-on time generation unit 208 is coupled to the burst mode signal generation module 206, the current detection pin 204, and the gate signal generation unit 210 for determining a turning-on time of the power converter 100 in the burst mode of the power converter 100 according to the first reference voltage FRV and the detection voltage VD, or according to the second reference voltage SRV and the detection voltage VD. Please refer to FIG. 2. FIG. 2 is a diagram illustrating the turning-on time generation unit 208 determining the turning-on time of the power converter 100 according to the first reference voltage FRV and the detection voltage VD, or according to the second reference voltage SRV and the detection voltage VD. As shown in FIG. 2, the turning-on time generation unit 208 can determine the turning-on time TON (FRV) of the power converter 100 in the burst mode according to the first reference voltage FRV and the detection voltage VD, and the turning-on time generation unit 208 can determine the turning-on time TON (SRV) of the power converter 100 in the burst mode according to the second reference voltage SRV and the detection voltage VD, wherein the turning-on time TON (FRV) is less than the turning-on time TON (SRV). Please refer to FIG. 3. FIG. 3 is a diagram illustrating a period TB of the burst mode corresponding to the gate control signal GCS. As shown in FIG. 3, the turning-on time generation unit 208 determines the turning-on time TON (FRV) and a turning-off time TOFF (FRV) corresponding to the turning-on time TON (FRV) according to the first reference voltage FRV and the detection voltage VD, wherein the period TB of the burst mode corresponding to the gate control signal GCS is equal to a sum of the turning-on time TON (FRV) and the turning-off time TOFF (FRV). Similarly, the turning-on time generation unit 208 can also determine the turning-on time TON (SRV) and the turning-off time TOFF (SRV) corresponding to the turning-on time TON (SRV) according to the second reference voltage SRV and the detection voltage VD. Meanwhile, the period TB of the burst mode corresponding to the gate control signal GCS is equal to a sum of the turning-on time TON (SRV) and the turning-off time TOFF (SRV).

As shown in FIG. 1, the control unit 2066 is coupled to the gate signal generation unit 210 for detecting a frequency FB corresponding to the gate control signal GCS, wherein the control unit 2066 can detect the frequency FB corresponding to the gate control signal GCS according to rising edges or falling edges of the gate control signal GCS. When the frequency FB is greater than a predetermined frequency (e.g. a lower limit 1 KHz of a human auditory frequency range), the control unit 2066 can further control the first comparator 2062 to generate the burst mode signal BMS according to the first reference voltage FRV and the feedback voltage VFB, and the turning-on time generation unit 208 can determine the turning-on time TON (FRV) according to the first reference voltage FRV and the detection voltage VD. As shown in FIG. 2, because the second reference voltage SRV is greater than the first reference voltage FRV, the turning-on time TON (FRV) of the power converter 100 in the burst mode is less than the turning-on time TON (SRV) of the power converter 100 in the burst mode. In addition, according to equation (1) and a condition of constant power, because the turning-on time TON (FRV) is shorter, the current I1 flowing through the primary side PRI of the power converter 100 is also smaller, resulting in a number of the gate control signal GCS generated by the gate signal generation unit 210 during the turning-on time TON (FRV) being increased to let input power of the power converter 100 be equal to output power of the power converter 100. Meanwhile, the frequency FB corresponding to the gate control signal GCS will be greater than an upper limit 22 KHz of the human auditory frequency range. In addition, in another embodiment of the present invention, when the frequency FB is greater than the predetermined frequency, the control unit 2066 can further control the first comparator 2062 to generate a control signal to the gate signal generation unit 210 according to the first reference voltage FRV and the feedback voltage VFB. Meanwhile, the gate signal generation unit 210 can leave the burst mode to generate agate control signal corresponding to a pulse width modulation mode of the power converter 100 according to the control signal, and a frequency of the gate control signal corresponding to the pulse width modulation mode is greater than the upper limit 22 KHz of the human auditory frequency range.

$$P=1/2\times L\times I_1^2\times TON(FRV)\times FB \quad (1)$$

As shown in equation (1), L is an inductance of an inductor 216 of the primary side PRI of the power converter 100.

In addition, when the frequency FB is less than the predetermined frequency, the control unit 2066 can control the second comparator 2064 to generate the burst mode signal BMS according to the second reference voltage SRV and the feedback voltage VFB, and the turning-on time generation unit 208 can determine the turning-on time TON (SRV) according to the second reference voltage SRV and the detection voltage VD. As shown in FIG. 2, because the second reference voltage SRV is greater than the first reference voltage FRV, the turning-on time TON (SRV) of the power converter 100 in the burst mode is greater than the turning-on time TON (FRV) of the power converter 100 in the burst mode. In addition, according to equation (1) and the condition of the constant power, because the turning-on time TON (SRV) is longer, the current I1 flowing through the primary side PRI of the power converter 100 is also greater, resulting in a number of the gate control signal GCS generated by the gate signal generation unit 210 during the turning-on time TON (SRV) being decreased to let input power of the power converter 100 be equal to output power of the power converter 100. Meanwhile, the frequency FB corresponding to the gate control signal GCS will be less than the lower limit 1 KHz of the human auditory frequency range. In addition, because the number of the gate control signal GCS generated by the gate signal generation unit 210 during the turning-on time TON (SRV) is decreased, light-load efficiency of the power converter 100 is better.

Figure 4:
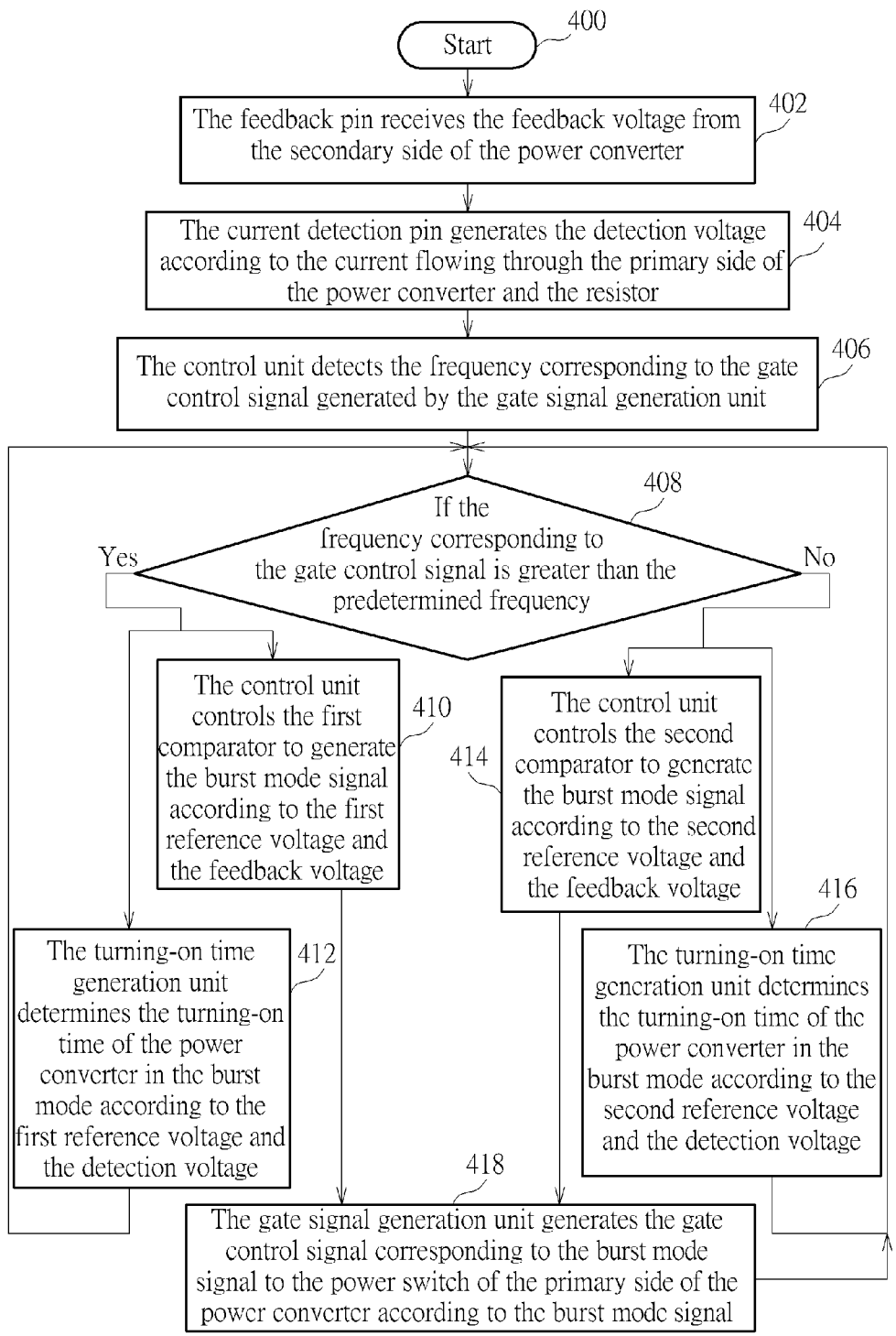
FIG. 4 is a flowchart illustrating a method for eliminating acoustic noise of a power converter according to a second embodiment.

Please refer to FIG. 1, FIG. 2, and FIG. 4. FIG. 4 is a flowchart illustrating a method for eliminating acoustic noise of a power converter according to a second embodiment. The method in FIG. 4 is illustrated using the controller 100 in FIG. 1. Detailed steps are as follows:

Step 400: Start.

Step 402: The feedback pin 202 receives the feedback voltage VFB from the secondary side SEC of the power converter 100.

Step 404: The current detection pin 204 generates the detection voltage VD according to the current I1 flowing through the primary side PRI of the power converter 100 and the resistor R.

Step 406: The control unit 2066 detects the frequency FB corresponding to the gate control signal GCS generated by the gate signal generation unit 210.

Step 408: If the frequency FB corresponding to the gate control signal GCS is greater than the predetermined frequency; if yes, go to Step 410 and Step 412; if no, go to Step 414 and Step 416.

Step 410: The control unit 2066 controls the first comparator 2062 to generate the burst mode signal BMS according to the first reference voltage FRV and the feedback voltage VFB, go to Step 418.

Step 412: The turning-on time generation unit 208 determines the turning-on time TON (FRV) of the power converter 100 in the burst mode according to the first reference voltage FRV and the detection voltage VD, go to Step 408.

Step 414: The control unit 2066 controls the second comparator 2064 to generate the burst mode signal BMS according to the second reference voltage SRV and the feedback voltage VFB, go to Step 418.

Step 416: The turning-on time generation unit 208 determines the turning-on time TON (SRV) of the power converter 100 in the burst mode according to the second reference voltage SRV and the detection voltage VD, go to Step 408.

Step 418: The gate signal generation unit 210 generates the gate control signal GCS corresponding to the burst mode signal BMS to the power switch 212 of the primary side PRI of the power converter 100 according to the burst mode signal BMS, go to Step 408.

In Step 402, as shown in FIG. 1, the feedback voltage VFB corresponds to the output voltage VOUT of the secondary side SEC of the power converter 100. In Step 406, the control unit 2066 can detect the frequency FB corresponding to the gate control signal GCS according to rising edges or falling edges of the gate control signal GCS. In Step 410 and Step 412, as shown in FIG. 1, when the frequency FB is greater than the predetermined frequency (e.g. the lower limit 1 KHz of the human auditory frequency range), the control unit 2066 can control the first comparator 2062 to generate the burst mode signal BMS according to the first reference voltage FRV and the feedback voltage VFB, and the turning-on time generation unit 208 can determine the turning-on time TON (FRV) according to the first reference voltage FRV and the detection voltage VD. In Step 414 and Step 416, as shown in FIG. 1, when the frequency FB is less than the predetermined frequency, the control unit 2066 can control the second comparator 2064 to generate the burst mode signal BMS according to the second reference voltage SRV and the feedback voltage VFB, and the turning-on time generation unit 208 can determine the turning-on time TON (SRV) according to the second reference voltage SRV and the detection voltage VD.

In Step 410 and Step 412, as shown in FIG. 2, because the second reference voltage SRV is greater than the first reference voltage FRV, the turning-on time TON (FRV) of the power converter 100 in the burst mode is less than the turning-on time TON (SRV) of the power converter 100 in the burst mode. In addition, according to equation (1) and the condition of the constant power, because the turning-on time TON (FRV) is shorter, the current I1 flowing through the primary side PRI of the power converter 100 is also smaller, resulting in the number of the gate control signal GCS generated by the gate signal generation unit 210 during the turning-on time TON (FRV) being increased to let input power of the power converter 100 be equal to output power of the power converter 100, and the frequency FB corresponding to the gate control signal GCS will be greater than the upper limit 22 KHz of the human auditory frequency range. In addition, in another embodiment of the present invention, when the frequency FB is greater than the predetermined frequency, the control unit 2066 can further control the first comparator 2062 to generate the control signal to the gate signal generation unit 210 according to the first reference voltage FRV and the feedback voltage VFB. Meanwhile, the gate signal generation unit 210 can leave the burst mode to generate the gate control signal corresponding to the pulse width modulation mode of the power converter 100 according to the control signal, and the frequency of the gate control signal corresponding to the pulse width modulation mode is greater than the upper limit 22 KHz of the human auditory frequency range. In addition, in Step 414 and Step 416, as shown in FIG. 2, according to equation (1) and the condition of the constant power, because the turning-on time TON (SRV) is longer, the current I1 flowing through the primary side PRI of the power converter 100 is also greater, resulting in the number of the gate control signal GCS generated by the gate signal generation unit 210 during the turning-on time TON (SRV) being decreased to let the input power of the power converter 100 be equal to the output power of the power converter 100, and the frequency FB corresponding to the gate control signal GCS will be less than the lower limit 1 KHz of the human auditory frequency range. In addition, because the number of the gate control signal GCS generated by the gate signal generation unit 210 during the turning-on time TON (SRV) is decreased, the light-load efficiency of the power converter 100 is better.

In Step 418, as shown in FIG. 1, the gate signal generation unit 210 can generate the gate control signal GCS corresponding to the burst mode of the power converter 100 to the power switch 212 according to the burst mode signal BMS, wherein the gate control signal GCS is transmitted to the power switch 212 through the gate pin 214, and the power switch 212 is turned on according to the gate control signal GCS.

Figure 5:
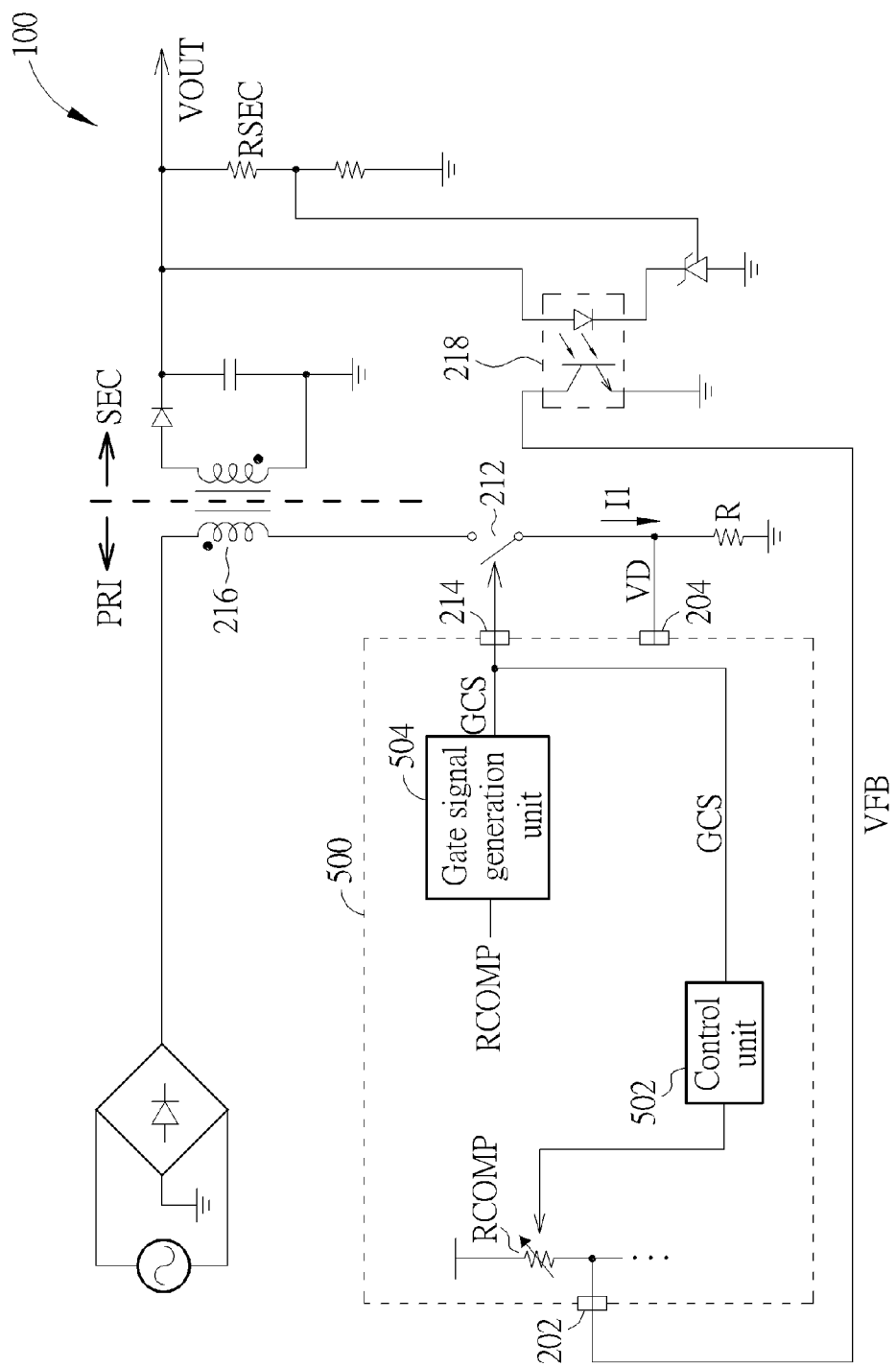
FIG. 5 is a diagram illustrating a controller for eliminating acoustic noise of the power converter according to a third embodiment.

Please refer to FIG. 5. FIG. 5 is a diagram illustrating a controller 500 for eliminating acoustic noise of the power converter 100 according to a third embodiment. As shown in FIG. 5, a difference between the controller 500 and the controller 200 is that the controller 500 includes a control unit 502 and a gate signal generation unit 504. As shown in FIG. 5, the control unit 502 is used for detecting the frequency FB corresponding to the gate control signal GCS in the burst mode of the power converter 100; and the gate signal generation unit 504 is coupled to the control unit 502 for generating the gate control signal GCS to the power switch 212 of the primary side PRI of the power converter 100 according to a resistance of a compensation resistor RCOMP coupled to the feedback pin 202 of the power converter 100, wherein the power switch 212 can be turned on according to the gate control signal GCS.

Because a direct current (DC) gain DG of the power converter 100 is determined according to equation (2), when the DC gain DG of the power converter 100 is increased, the frequency FB corresponding to the gate control signal GCS is increased accordingly, and when the DC gain DG of the power converter 100 is decreased, the frequency FB corresponding to the gate control signal GCS is decreased accordingly.

$$DG = CTR \times \frac{RCOMP}{RSEC} \qquad (2)$$

As shown in equation (2), CTR is a proportional constant, and RSEC is a resistor coupled to a photo coupler 218 of the secondary side SEC of the power converter 100.

Therefore, when the frequency FB is greater than the predetermined frequency (e.g. the lower limit 1 KHz of the human auditory frequency range), the control unit 502 can increase the resistance of the compensation resistor RCOMP to increase the DC gain DG of the power converter 100, resulting in the frequency FB corresponding to the gate control signal GCS being greater than the upper limit 22 KHz of the human auditory frequency range. When the frequency FB is less than the predetermined frequency, the control unit 502 can decrease the resistance of the compensation resistor RCOMP to decrease the DC gain DG of the power converter 100, resulting in the frequency FB corresponding to the gate control signal GCS being further less than the lower limit 1 KHz of the human auditory frequency range, and because the number of the gate control signal GCS generated by the gate signal generation unit 210 is decreased, light-load efficiency of the power converter 100 is better.

Figure 6:
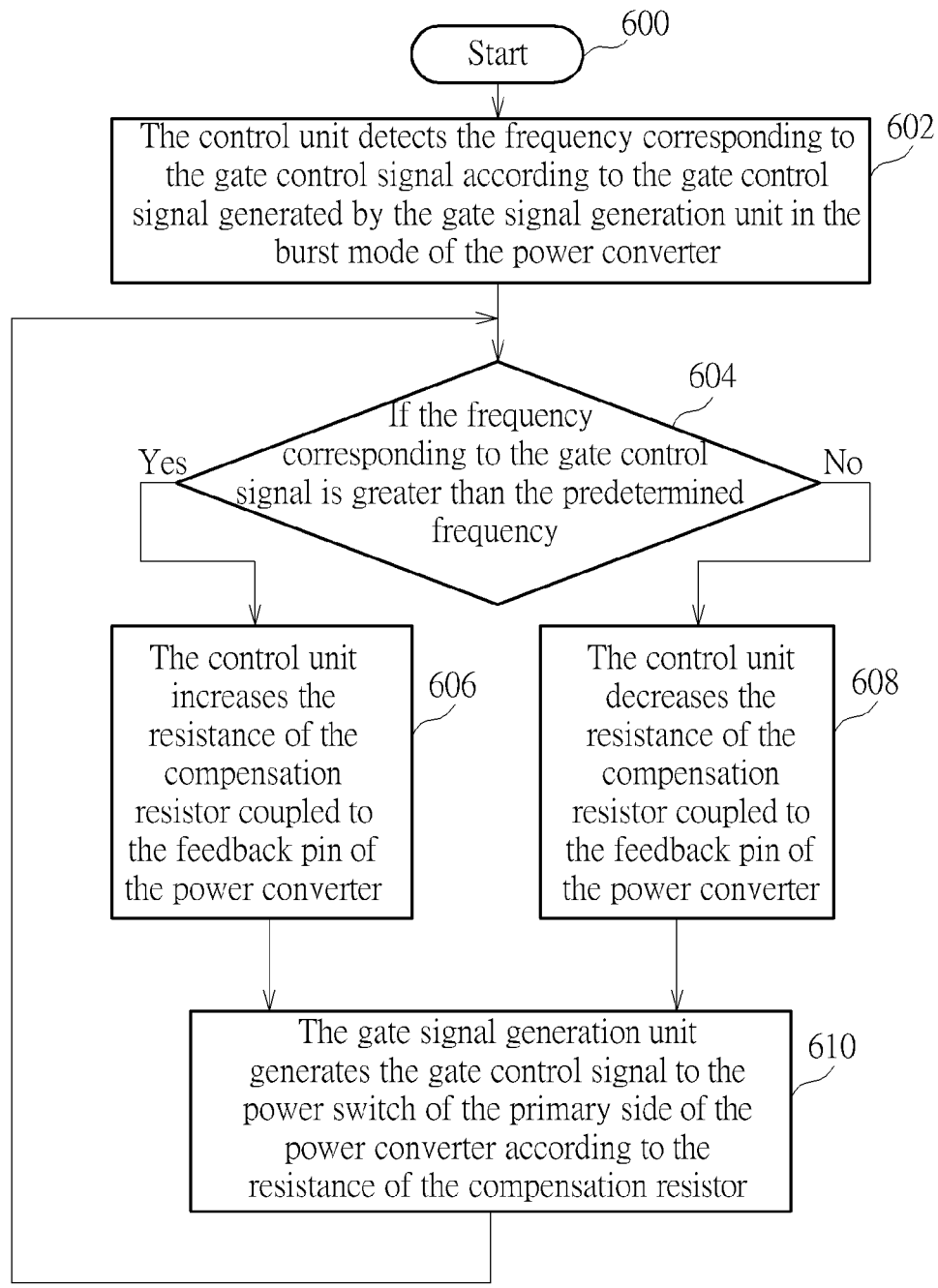
FIG. 6 is a flowchart illustrating a method for eliminating acoustic noise of a power converter according to a fourth embodiment.

Please refer to FIG. 5 and FIG. 6. FIG. 6 is a flowchart illustrating a method for eliminating acoustic noise of a power converter according to a fourth embodiment. The method in FIG. 6 is illustrated using the controller 500 in FIG. 5. Detailed steps are as follows:

Step 600: Start.

Step 602: The control unit 502 detects the frequency FB corresponding to the gate control signal GCS according to the gate control signal GCS generated by the gate signal generation unit 504 in the burst mode of the power converter 100.

Step 604: If the frequency FB corresponding to the gate control signal GCS is greater than the predetermined frequency; if yes, go to Step 606; if no, go to Step 608.

Step 606: The control unit 502 increases the resistance of the compensation resistor RCOMP coupled to the feedback pin 202 of the power converter 100, go to Step 610.

Step 608: The control unit 502 decreases the resistance of the compensation resistor RCOMP coupled to the feedback pin 202 of the power converter 100, go to Step 610.

Step 610: The gate signal generation unit 504 generates the gate control signal GCS to the power switch 212 of the primary side PRI of the power converter 100 according to the resistance of the compensation resistor RCOMP, go to Step 604.

Differences between the embodiment in FIG. 6 and the embodiment in FIG. 4 are that in Step 606, the control unit 502 increases the resistance of the compensation resistor RCOMP; in Step 608, the control unit 502 decreases the resistance of the compensation resistor RCOMP; and in Step 610, the gate signal generation unit 504 generates the gate control signal GCS according to the resistance of the compensation resistor RCOMP. That is to say, when the frequency FB is greater than the predetermined frequency (e.g. the lower limit 1 KHz of the human auditory frequency range), the control unit 502 can increase the resistance of the compensation resistor RCOMP to increase the DC gain DG of the power converter 100, resulting in the frequency FB corresponding to the gate control signal GCS being greater than the upper limit 22 KHz of the human auditory frequency range. When the frequency FB is less than the predetermined frequency, the control unit 502 can decrease the resistance of the compensation resistor RCOMP to decrease the DC gain DG of the power converter 100, resulting in the frequency FB corresponding to the gate control signal GCS being further less than the lower limit 1 KHz of the human auditory frequency range, and because the number of the gate control signal GCS generated by the gate signal generation unit 210 is decreased, the light-load efficiency of the power converter 100 is better.

To sum up, the controller for eliminating acoustic noise of a power converter and the related method thereof utilize the control unit to detect the frequency corresponding to the gate control signal generated by the gate signal generation unit, wherein when the frequency corresponding to the gate control signal is greater than the predetermined frequency, the controller and the method utilize the burst mode signal generation module, the turning-on time generation unit, the gate signal generation unit, the first reference voltage, the feedback voltage corresponding to the output voltage of the secondary side of the power converter, and the detection voltage corresponding to the current flowing through the primary side of the power converter to increase the frequency corresponding to the gate control signal; when the frequency corresponding to the gate control signal is less than the predetermined frequency, the controller and the method utilize the burst mode signal generation module, the turning-on time generation unit, the gate signal generation unit, the second reference voltage, the feedback voltage, and the detection voltage to decrease the frequency corresponding to the gate control signal. In addition, the controller and the method can also utilize the control unit to detect the frequency corresponding to the gate control signal generated by the gate signal generation unit, wherein when the frequency corresponding to the gate control signal is greater than the predetermined frequency, the controller and the method utilize the control unit to increase the resistance of the compensation resistor coupled to the feedback pin of the power converter, resulting in the frequency corresponding to the gate control signal being increased; and when the frequency corresponding to the gate control signal is less than the predetermined frequency, the controller and the method utilize the control unit to decrease the resistance of the compensation resistor coupled to the feedback pin of the power converter, resulting in the frequency corresponding to the gate control signal being decreased. Therefore, the present invention can ensure that the frequency corresponding to the gate control signal can fall outside the human auditory frequency range to eliminate acoustic noise of the power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for eliminating acoustic noise of a power converter, the controller comprising:
    a feedback pin for receiving a feedback voltage from a secondary side of the power converter, wherein the feedback voltage corresponds to an output voltage of the secondary side of the power converter;
    a current detection pin for generating a detection voltage according to a current flowing through a primary side of the power converter and a resistor;
    a burst mode signal generation module coupled to the feedback pin for generating a burst mode signal according to a first reference voltage and the feedback voltage, or according to a second reference voltage and the feedback voltage, wherein the burst mode signal generation module comprises:
        a first comparator for generating the burst mode signal according to the first reference voltage and the feedback voltage;
        a second comparator for generating the burst mode signal according to the second reference voltage and the feedback voltage; and
        a control unit coupled to the gate signal generation unit for detecting a frequency corresponding to the gate control signal, wherein when the frequency is greater than a predetermined frequency, the control unit controls the first comparator to generate the burst mode signal according to the first reference voltage and the feedback voltage, when the frequency is less than the predetermined frequency, the control unit controls the second comparator to generate the burst mode signal according to the second reference voltage and the feedback voltage, and the second reference voltage is greater than the first reference voltage;
    a gate signal generation unit coupled to the burst mode signal generation module for generating a gate control signal corresponding to a burst mode of the power converter to a power switch of the primary side of the power converter according to the burst mode signal, wherein the power switch is turned on according to the gate control signal; and
    a turning-on time generation unit coupled to the burst mode signal generation module, the current detection pin, and the gate signal generation unit for determining a turning-on time of the power converter in the burst mode of the power converter according to the first reference voltage and the detection voltage, or according to the second reference voltage and the detection voltage.

2. The controller of claim 1, further comprising:
    a gate pin, wherein the gate control signal is transmitted to the power switch through the gate pin.

3. A controller for eliminating acoustic noise of a power converter, the controller comprising:
    a control unit for detecting a frequency corresponding to a gate control signal in a burst mode of the power converter, wherein when the frequency is greater than a predetermined frequency, the control unit increases a resistance of a compensation resistor coupled to a feedback pin of the power converter, and when the frequency is less than the predetermined frequency, the control unit decreases the resistance of the compensation resistor; and a gate signal generation unit coupled to the control unit for generating the gate control signal to a power switch of a primary side of the power converter according to the resistance of the compensation resistor, wherein the power switch is turned on according to the gate control signal.

4. The controller of claim 3, further comprising:
a gate pin, wherein the gate control signal is transmitted to the power switch through the gate pin.

5. A method for eliminating acoustic noise of a power converter, wherein a controller applied to the method comprises a feedback pin, a current detection pin, a burst mode signal generation module, a turning-on time generation unit, and a gate signal generation unit, wherein the burst mode signal generation module comprises a first comparator, a second comparator, and a control unit, the method comprising:

the feedback pin receiving a feedback voltage from a secondary side of the power converter, wherein the feedback voltage corresponds to an output voltage of the secondary side of the power converter;

the current detection pin generating a detection voltage according to a current flowing through a primary side of the power converter and a resistor;

the control unit detecting a frequency corresponding to a gate control signal;

the control unit controlling the first comparator to generate a burst mode signal according to a first reference voltage and the feedback voltage when the frequency is greater than a predetermined frequency;

the turning-on time generation unit determining a turning-on time of the power converter in a burst mode of the power converter according to the first reference voltage and the detection voltage, or according to the second reference voltage and the detection voltage; and the gate signal generation unit generating the gate control signal corresponding to the burst mode of the power converter to a power switch of the primary side of the power converter according to the burst mode signal, wherein the power switch is turned on according to the gate control signal.

6. The method of claim 5, further comprising:
the control unit controlling the second comparator to generate the burst mode signal according to the second reference voltage and the feedback voltage when the frequency is less than the predetermined frequency, wherein the second reference voltage is greater than the first reference voltage.

7. The method of claim 5, wherein the turning-on time generation unit determining the turning-on time of the power converter in the burst mode of the power converter according to the first reference voltage and the detection voltage, or according to the second reference voltage and the detection voltage comprises:

the turning-on time generation unit determining the turning-on time of the power converter in the burst mode of the power converter according to the first reference voltage and the detection voltage when the frequency is greater than the predetermined frequency.

8. The method of claim 5, wherein the turning-on time generation unit determining the turning-on time of the power converter in the burst mode of the power converter according to the first reference voltage and the detection voltage, or according to the second reference voltage and the detection voltage comprises:

the turning-on time generation unit determining the turning-on time of the power converter in the burst mode of the power converter according to the second reference voltage and the detection voltage when the frequency is less than the predetermined frequency.

9. A method for eliminating acoustic noise of a power converter, wherein a controller applied to the method comprises a control unit and a gate signal generation unit, the method comprising:

the control unit detecting a frequency corresponding to a gate control signal generated by the gate signal generation unit in a burst mode of the power converter;

the control unit increasing a resistance of a compensation resistor coupled to a feedback pin of the power converter when the frequency is greater than a predetermined frequency; and the gate signal generation unit generating the gate control signal to a power switch of a primary side of the power converter according to the resistance of the compensation resistor, wherein the power switch is turned on according to the gate control signal.

10. The method of claim 9, further comprising:
the control unit decreasing the resistance of the compensation resistor when the frequency is less than the predetermined frequency.

* * * * *